Dec. 24, 1935.  E. P. BULLARD  2,025,268
MULTIPLE SPINDLE STATIONARY WORK TURNING APPARATUS
Filed Aug. 9, 1933  3 Sheets-Sheet 1

INVENTOR.
EDWARD P. BULLARD
BY
ATTORNEY

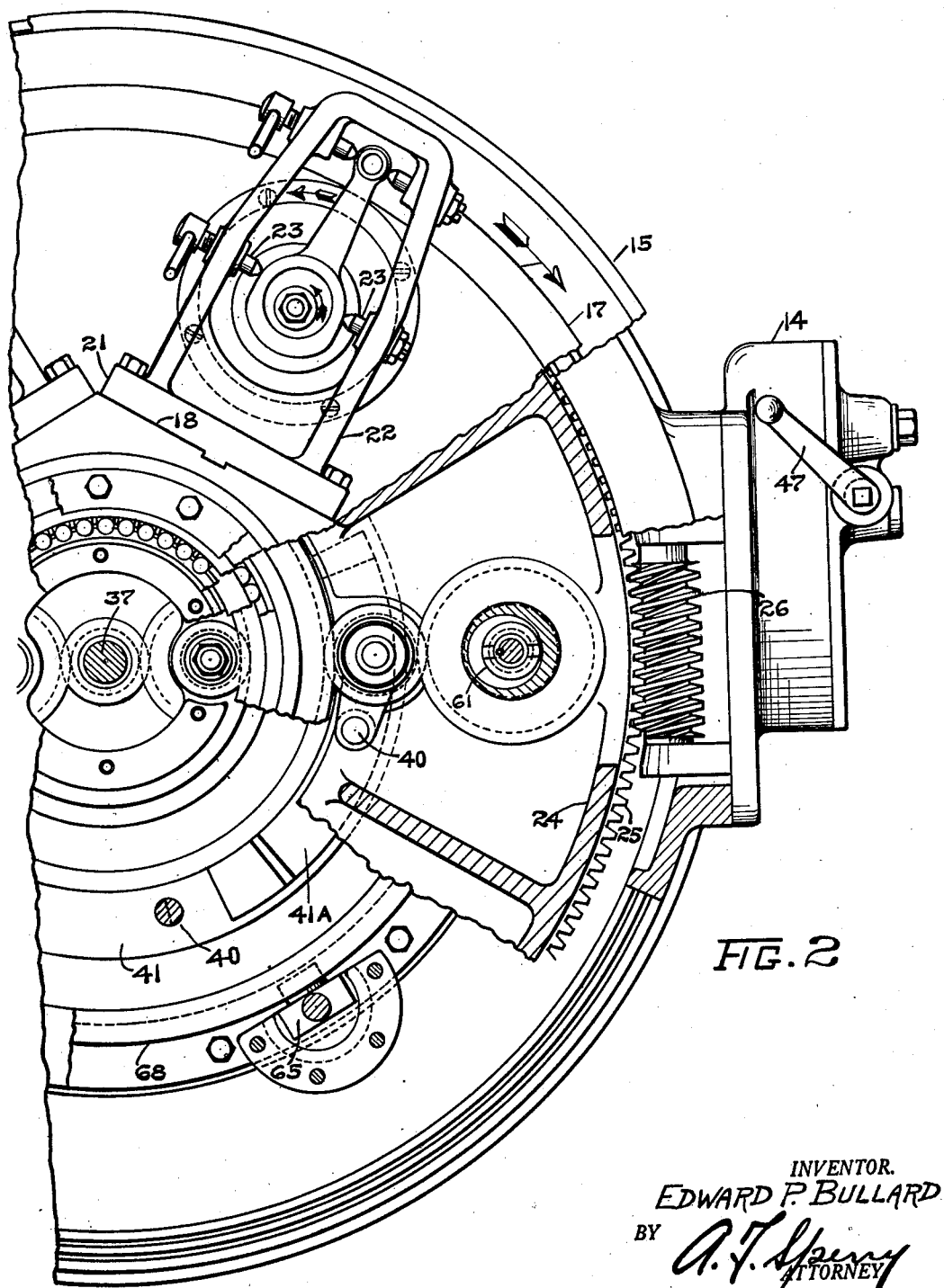

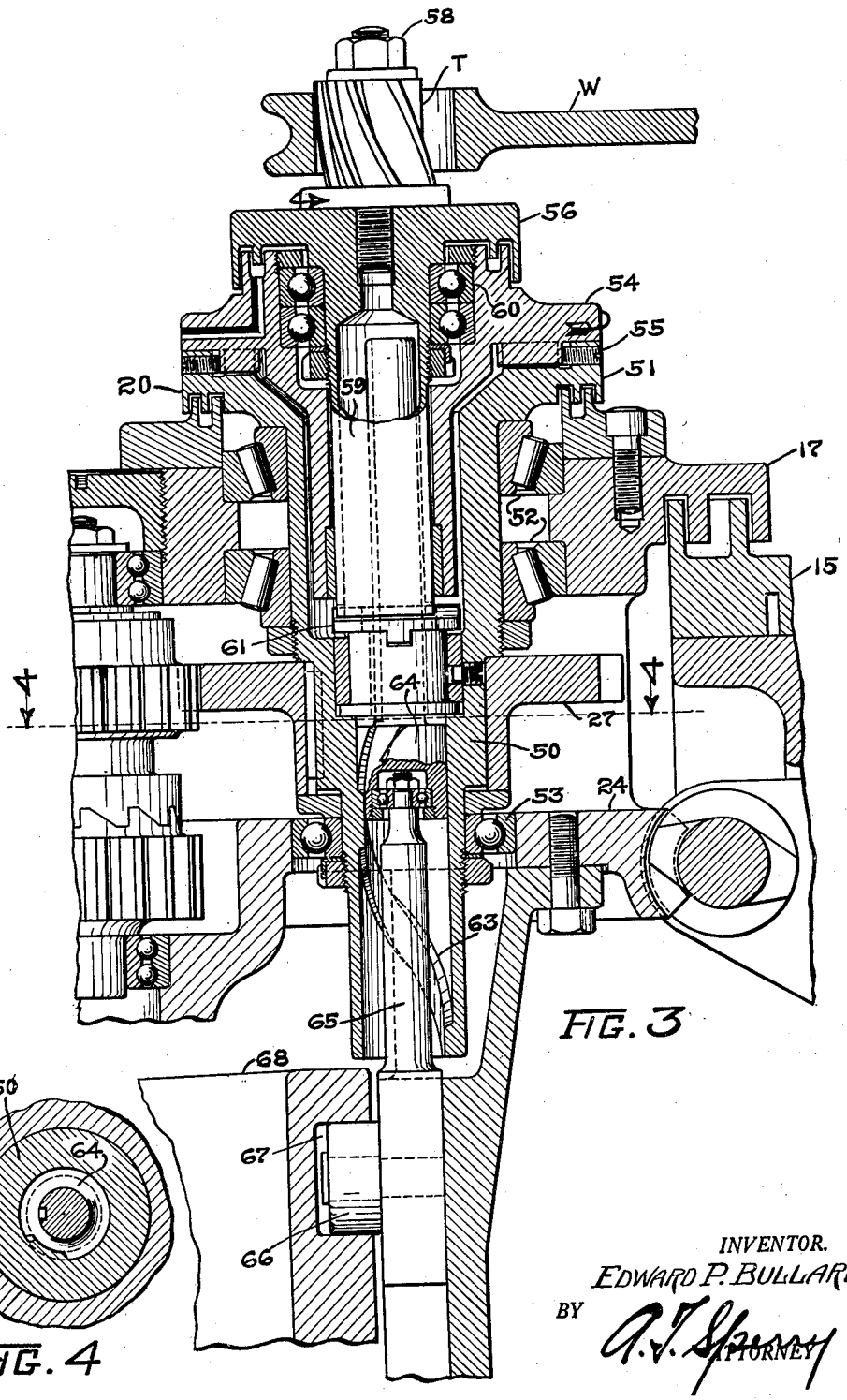

Patented Dec. 24, 1935

2,025,268

UNITED STATES PATENT OFFICE 2,025,268

MULTIPLE SPINDLE STATIONARY WORK TURNING APPARATUS

Edward P. Bullard, Bridgeport, Conn., assignor to The Bullard Company, a corporation of Connecticut Application August 9, 1933, Serial No. 684,314

21 Claims. (Cl. 29—38)

This invention relates to a multiple spindle apparatus for turning work which is retained stationarily with respect to the cutter. The method involved partakes of the advantages of the method set forth in Patent No. 1,899,608, dated February 28, 1933, as well as the method set forth in the co-pending application Serial No. 662,748, filed March 25, 1933. The apparatus is of the class usually referred to as "multiple spindle continuous turning machines", each spindle and work holding unit being a counterpart of the structure of the application.

It is, therefore, among the objects of the invention to provide a multiple spindle apparatus which partakes of the desiderata of the method and apparatus disclosed in the aforementioned application.

Obviously, the provision of a multiple spindle apparatus utilizing the method and mechanical principles of the aforementioned application has as its prime objective to increase the speed of production, and thus, it is among the objectives of the invention to provide a machine of the character set forth, which is designed for mass production, which will be economical and efficient in operation, will reduce the amount of manual labor required, will reduce the required floor space, and will be more efficient in the use of power.

These, and numerous other objects, such as the provision of certain novel structural features, will be apparent from a consideration of the drawings and specifications. In general, the apparatus may be referred to as an application of the method and apparatus of the co-pending single spindle appplication as applied to a continually turning multiple spindle apparatus, such as disclosed in my prior Patent No. 1,574,726. Thus, the device consists of a continually rotatable table, carrying a plurality of work holding units and related tool spindles; each tool spindle is adapted to move its tool with respect to the work in an orbital path at cutting speed while rotating the tool on its own axis at feeding speeds, the tool being of the stepped bladed type.

In the drawings, Figure 1 is a vertical sectional view showing one embodiment of the invention.

Figure 2 is a fragmentary plan view broken away on two planes, as indicated by the arrows A and B in Figure 1.

Figure 3 is a detail view of the spindle; and

Figure 4 is a sectional view taken on the line 4—4 of Figure 3.

Figure 1:
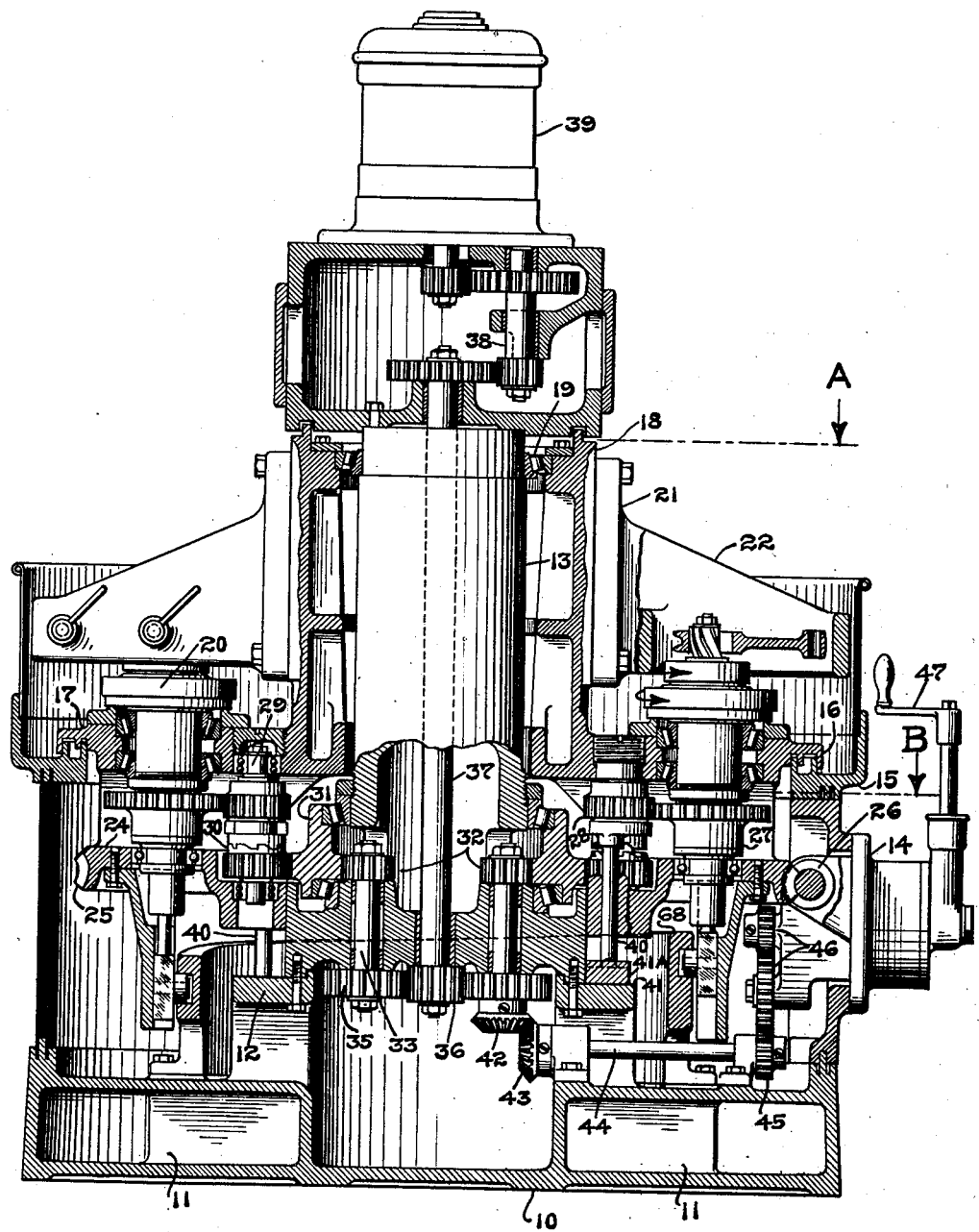

In the drawings, the numeral 10 represents the machine tool base, which may be formed to provide chambers 11 for lubricant and/or cutting compound. Centrally of the base 10, there extends upwardly as at 12, a column-supporting and bearing-providing member upon which is mounted a column 13. The base 10 also supports a control housing 14, and an annular chip trough 15, which is flanged to co-operate with flanges 16 of the spindle carrying table 17. The table 17 is formed with an upstanding central hub 18, which surrounds the column 13, the table being suitably supported from the column 13 as by the bearings 19.

Through equally spaced apertures in the table 17, tool spindles 20 are ranged, their structure and mounting being more clearly illustrated in Figure 3. Adjacent to each spindle, hub 18 carries a work holding fixture, including the base 21, attached to the hub, a substantially U-shaped bracket 22, and work securing and aligning elements, such as the pins 23. (Fig. 2.)

In the operation of the apparatus, the table carrying the spindles and the work holders is adapted to be revolved, a lower table flange 24 being provided with a spiral toothed ring gear 25, which is enmeshed with a spiral driving gear 26, whereby the table is continually rotated, thus to bring the spindles successively to the loading station, where finished work is removed and new work placed in the fixture.

During the rotative movement of the table, the spindles are synchronously driven, through the medium of spindle gears 27, which are in continual mesh with spindle driving gears 28, which have bearings in the table. Means for disconnecting the drive of the spindle are provided by the axial movement of the gear 28, a downward extending hub of which is provided with clutch teeth adapted to engage the similar clutch teeth on the continually rotating intermediate gears 30, all of which are driven from an internally and externally toothed ring gear 31, the inner teeth of which engage continually driven gears 32, mounted on shafts 33, the lower ends of which bear gears 35, meshing with a central gear 36, mounted upon a central main drive shaft 37, which may be suitably driven from any source of power, such as through the reduction gearing, generally indicated at 38, and from the motor, illustrated at 39.

Since it is desirable that the tool spindle come to rest during one portion of its orbital movement where finished work is removed from the fixture and new work secured thereto, the slidable gears 28, with their clutch forming hubs, are provided with operating rods 40, which normally rest upon the flat upper surface 41 of the portion 12. At an appropriate place on the surface 41, a cam 41A is mounted, upon which the rods 40 ride, thus to raise gear 28 and disestablish the spindle drive while the spindles are passing the loading station, which is here arranged at the right of Figures 1 and 2.

Drive for the table gear is preferably established by a branch connection from the spindle drives, thus to maintain pre-determined synchronism between the spindle speed and the table speed. Thus, one of the shafts 33 is provided with a bevelled pinion 42 meshing with a companion gear 43 on a horizontal shaft 44, the opposite end of which is provided with a gear 45, which drives the pull gears 46, which are connected through a clutch mechanism indicated as mounted within the housing 14, with the gear 26, a suitable clutch controlling handle 47 being provided to control the table movement. Obviously, by changing the gears 46, various synchronized speeds between the table and spindles may be provided for.

With reference to Figures 3 and 4, it will be seen that the spindle 20 is of tubular construction, its body 50 forming a head 51, and extending downwardly within adjustable bearings 52, mounted in the table 17, below which the spindle gear 27 is mounted. The lower end of the spindle is mounted in and guided by a bearing 53, carried by the lower table flange 24. The head 51 of the spindle is adapted to receive thereon an eccentrically positioned tool holder body 54, the eccentricity of which to the axis of the spindle body may be suitably adjusted as by altering the setting of the set screws 55. Mounted upon the tool holder body 54 for independent rotation at feeding speeds, is the tool holder 56, which, by mounting in its bearings, is retained in the adjusted eccentricity with respect to the tool holder body. The holder 56 has secured thereto the tool T, the mounting of which is here conventionally shown as by a bolt and nut construction, indicated at 58.

The eccentric holder 56 includes a tubular body 59, which extends downwardly through anti-friction bearings 60, its lower end being joined as by an Oldham coupling 61, the lower part being keyed to a vertically movable shaft 64, the lower end forming a nut, the outer face of which is provided with a helical channel which engages a helical thread 63, formed in the lower end of the spindle body 50. Rotation of the shaft 64 will transmit rotation to the tool holder. Reciprocation of the nut, whereby it is rotated through an engagement with the thread 63, is effected through reciprocation thereof by the rotatable mounting of the nut upon the upper end of a slide rod 65, the lower end of which carries a roller 66, which is in engagement with a cam path 67, cut on the outer face of a stationary cam 68, mounted on the base 10.

In the operation of the device, with the motor 39 in operation, it will be seen that the shaft 37 is continually rotated, thus rotating the spindles through the medium of gears 35, 32, 31, 30 and 28, all the spindles being continually rotated except that one which is in the loading position, which is disconnected from its drive through the raising of its gear 28 by the operating rod 40, this position being indicated at the right in Figure 1.

When the clutch handle 47 is operated to establish the table drive connection, it will be seen that the table will be rotated at a synchronous speed with the spindles through the medium of gears 42, 43, 45, 46 and 26. As the table is rotated, the engagement of the rollers 66 with the cam path 67 will cause a reciprocation of the rod 65, thus to impart slow rotation of the tool T upon its own axis while being rotated at cutting speeds in an orbital path.

In the design of the apparatus illustrated, the cam path is such as to give the tool substantially one rotation on its own axis, while the table is completing one revolution. Before each spindle reaches the loading station, the cam cycle is such as to move the rod 65 downwardly, thus to return the tool to its initial position.

The tool used with the present apparatus consists of a body provided with a plurality of radially stepped blades, as disclosed in Patent No. 1,899,608. It will be seen that, as in connection with the method of the patent mentioned, a cutting action passes successively down each blade edge, and a skiving, continuous cutting action results, and as the tool is rotated, each successive blade will, through the orbital movement of the tool at cutting speed, successively reduce the metal on the internal diameter of the work W.

It will be understood that the invention is not limited to the structural details herein disclosed, but that numerous changes, modifications and the full use of equivalents may be resorted to without departing from the spirit or scope of the invention as outlined in the appended claims.

What I claim is:

1. In a machine tool, the combination of a fixed vertical column, a carrier supported from said column, and rotatable thereabout, a plurality of stationary work holders supported by said carrier, a corresponding plurality of longitudinally stationary tool spindles mounted on said carrier adjacent to said work holders, and the means for rotating said carrier on its axis and said spindles on their axes, and means for successively bringing the tool spindles to a position of rest while the carrier is rotating.

2. In a machine tool, the combination of a fixed vertical column, a carrier supported from said column, and rotatable thereabout, a plurality of stationary work holders supported by said carrier, a corresponding plurality of tool spindles mounted on said carrier adjacent to said work holders, and the means for rotating said carrier on its axis and said spindles on their axes, and means for successively bringing the tool spindles to a position of rest while the carrier is rotating, said last mentioned means including cam actuated spindle clutch mechanisms.

3. In a machine tool, the combination of a fixed vertical column, a carrier supported from said column, and rotatable thereabout, a plurality of stationary work holders supported by said carrier, a corresponding plurality of tool spindles mounted on said carrier adjacent to said work holders, and the means for rotating said carrier on its axis and said spindles on their axes, and means for successively bringing the tool spindles to a position of rest while the carrier is rotating, said last mentioned means including a cam mounted on said column, and individual spindle clutches actuated by said cam.

4. In a machine tool, the combination of a base, a fixed vertical column rising therefrom, a rotatable carrier mounted on said column, and rotatable thereabout, a plurality of fixed work holders mounted on said carrier, a corresponding plurality of rotatable tool spindles mounted on said carrier adjacent to said work holders, a central drive shaft for said carrier and spindles, individual clutch controlled driving connections from said shafts to said spindles, cam means for successively disengaging said clutches so as to successively bring each tool spindle to a position of rest while the carrier is rotating, and manually controlled clutch means for driving said carrier from said shaft, said means including change gears for varying the speed ratio between said table and said spindles.

5. In a multiple spindle machine tool, including a continuously rotatable carrier supporting a plurality of work holders, and a corresponding plurality of tool spindles, the combination of tools carried by said spindles, and means for rotating said tools upon their own axes independently of the rotation of said spindles.

6. In a multiple spindle machine tool, including a continuously rotatable carrier supporting a plurality of work holders, and a corresponding plurality of tool spindles, the combination of tools carried by said spindles, and means for rotating said tools upon their own axes independently of the rotation of said spindles, said means being operable by rotation of said carrier.

7. In a multiple spindle machine tool, including a continuously rotatable carrier supporting a plurality of work holders, and a corresponding plurality of tool spindles, the combination of tools carried by said spindles, and means for rotating said tools upon their own axes independently of the rotation of said spindles, said means being operable by rotation of said carrier, and including a fixed cam path with respect to which said spindles move.

8. In a multiple spindle machine tool, including a continuously rotatable carrier supporting a plurality of work holders, and a corresponding plurality of tool spindles, the combination of tools carried by said spindles, and means for rotating said tools upon their own axes independently of the rotation of said spindles, said means being operable by rotation of said carrier, and including a fixed cam path with respect to which said spindles move, together with operating rods reciprocable during movement of the carrier through engagement with said path.

9. In a multiple spindle machine tool, including a continuously rotatable carrier, rotatable tool spindles therefor, tools eccentrically mounted on said spindles for movement in an orbital path through rotation of the spindles, and means, operable by rotation of the carrier, to rotate the tools on their own axes.

10. In a multiple spindle machine tool, including a continuously rotatable carrier, rotatable tool spindles therefor, tools eccentrically mounted on said spindles for movement in an orbital path through rotation of the spindles, and means, operable by rotation of the carrier, to rotate the tools on their own axes, said means including a cam path with respect to which said carrier moves.

11. In a machine tool, the combination with a continuously rotatable carrier of tools carried thereby, and means, operable by rotation of the carrier, to rotate said tools on their own axes.

12. In a machine tool, the combination with a continuously rotatable carrier of tools carried thereby, and means, operable by rotation of the carrier, to rotate said tools on their own axes, and to return said tools to their initial position.

13. In a machine tool, the combination with a continuously rotatable carrier of tools carried thereby, and means, operable by rotation of the carrier, to rotate said tools on their own axes, and to return said tools to their initial position in one cycle of rotation of the carrier.

14. In a machine tool, the combination with a continuously rotatable carrier of tools carried thereby, and means, operable by rotation of the carrier, to rotate said tools on their own axes, and to return said tools to their initial position in one cycle of rotation of the carrier, each tool being eccentrically supported on a rotatable spindle whereby said tools moved in an orbital path during its rotation on its axis.

15. In a machine tool, the combination of a rotatable table, a plurality of stationary work clamping means, secured to the table, a corresponding plurality of rotatable tool spindles mounted on the table adjacent the clamping means and tools mounted on said spindles rotatable therewith and with respect thereto.

16. In a machine tool, the combination of a rotatable table, a plurality of stationary work clamping means, secured to the table, a corresponding plurality of rotatable tool spindles mounted on the table adjacent the clamping means and a plurality of tools having axes parallel with the axes of the spindles and means for rotating said tools upon their own axes independent of the rotation of the spindles.

17. In a machine tool, the combination of a rotatable table, a plurality of stationary work clamping means, secured to the table, a corresponding plurality of rotatable tool spindles mounted on the table adjacent the clamping means, a plurality of tools having axes parallel with the axes of the spindles, means for rotating said tools upon their own axes independently of the rotation of the spindles, driving means for said spindles and means for clutching and unclutching said driving means while the carrier is rotated.

18. In a machine tool, the combination of a rotatable table, a plurality of stationary work clamping means, secured to the table, a corresponding plurality of rotatable tool spindles mounted on the table adjacent the clamping means, a plurality of tools having axes parallel with the axes of the spindles, means for rotating said tools upon their own axes independently of the rotation of the spindles, driving means for said spindles and means for clutching and unclutching said driving means while the carrier is rotated, said last mentioned means being operable during a predetermined arc through which the spindles move in their rotation with the table.

19. In a machine tool, the combination of a rotatable table, a plurality of stationary work holders mounted thereon, a corresponding plurality of rotatable tool spindles fixed against longitudinal movement, and mounted to correspond with the tool holders, means for rotating said table and said spindles and tools carried by said spindles and means for rotating said tools independently of said spindles.

20. In a machine tool, the combination of a rotatable table, a plurality of stationary work holders mounted thereon, a corresponding plurality of rotatable tool spindles fixed against longitudinal movement, and mounted to correspond with the tool holders, means for rotating said table and said spindles and tools carried by said spindles and means for rotating said tools with said spindles and on their own axes independently thereof.

21. In a machine tool, the combination of a rotatable table, a plurality of stationary work holders mounted thereon, a corresponding plurality of rotatable tool spindles fixed against longitudinal movement, and mounted to correspond with the tool holders, means for rotating said table and said spindles and tools carried by said spindles and means for rotating said tools with said spindles and on their own axes independently thereof, the axes of the tools being operable with the axes of the spindles.

EDWARD P. BULLARD.